(12) United States Patent
Gerhards

(10) Patent No.: US 8,180,211 B2
(45) Date of Patent: May 15, 2012

(54) DROP DETECTION USING LENS POSITION SENSING OF CAMERA MODULE

(75) Inventor: Timo Gerhards, Köngen (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 12/661,756

(22) Filed: Mar. 23, 2010

(65) Prior Publication Data

US 2011/0142433 A1 Jun. 16, 2011

(30) Foreign Application Priority Data

Dec. 15, 2009 (EP) ..................................... 09368051

(51) Int. Cl.
*G03B 17/00* (2006.01)
(52) U.S. Cl. ............................................ 396/87; 396/90
(58) Field of Classification Search .............. 396/52–55, 396/87, 90, 133
See application file for complete search history.

(56) References Cited

U.S. PATENT DOCUMENTS

| | | | | |
|---|---|---|---|---|
| 4,918,479 A * | 4/1990 | Inoue et al. | ..................... | 396/90 |
| 6,104,878 A * | 8/2000 | Toguchi et al. | ................. | 396/52 |
| 7,333,723 B2 | 2/2008 | Sato | | |
| 7,408,586 B2 | 8/2008 | Ueda et al. | | |
| 7,636,517 B2 * | 12/2009 | Klinghult | ........................ | 396/53 |
| 7,657,167 B2 | 2/2010 | Utz | | |
| 2008/0253003 A1 | 10/2008 | Shin et al. | | |

FOREIGN PATENT DOCUMENTS

| | | |
|---|---|---|
| EP | 0 457 389 | 11/1991 |
| EP | 1 903 363 | 3/2008 |
| JP | 02226130 | 9/1990 |

OTHER PUBLICATIONS

Co-pending US Patent DI08-006, U.S. Appl. No. 12/658,280, filed Feb. 5, 2010, "Camera Shutter and Position Control Thereof," assigned to the same.
European Search Report 10368006.2-2217 Mail Date—Feb. 24, 2011.

* cited by examiner

*Primary Examiner* — W. B. Perkey
(74) *Attorney, Agent, or Firm* — Saile Akerman LLC; Stephen B. Ackerman

(57) ABSTRACT

Systems and methods to achieve an auto-focus camera with a movable lens barrel having a mechanic shock detection capability combined with a re-initialization of the camera module have been disclosed. This re-initialization may comprise moving the lens barrel displaced by the shock to a home position. In a preferred embodiment of the invention a motor with integrated position detection has been used. In a normal operation the position detection feature senses the actual position of the lens, e.g. during auto-focusing of the lens barrel, and provides this position information to a control unit which is controlling the movement of the lens barrel to a target position. In case of a mechanic shock, e.g. if the camera module drops to ground, the control unit detects an extreme rapid displacement of the lens barrel and initiates a re-initialization of the camera module.

5 Claims, 6 Drawing Sheets

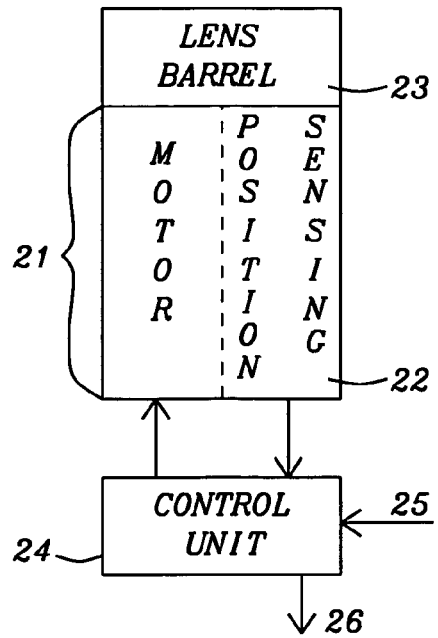

FIG. 2

| Provide a camera module having a movable lens barrel, comprising a lens barrel control system comprising a motor to move the lens barrel, a lens barrel position sensing feature, and a control unit providing input to the motor to reach a desired position of the lens barrel | —30 |

↓

| Detect a mechanic shock via an unusual fast displacement of the lens barrel sensed by the position sensing feature | —31 |

↓

| Re-initializing the camera module after a mechanic shock has been detected | —32 |

FIG. 3

DROP DETECTION USING LENS POSITION SENSING OF CAMERA MODULE

RELATED APPLICATION

This application is related to the following US patent application:

DI08-006, titled "Camera Shutter and position control thereof", Ser. No. 12/658,280, filing date Feb. 5, 2010 and is assigned to the same assignee.

The content of this application is hereby incorporated by reference in their entirety.

BACKGROUND OF THE INVENTION (1) Field of the Invention

This invention relates generally to camera modules and relates more specifically to movable lens barrels being moved using ball bearings and a detection system of heavy mechanic shock as e.g. if the device holding the camera module drops to ground.

(2) Description of the Prior Art

Digital camera modules are used with many electronic devices such as e.g. mobile phones, personal data assistants (PDAs), computers, etc. These camera modules have to be as small as possible, reliable, and easy to be used, robust and require minimal power consumption. Furthermore the design of the camera modules should allow low manufacturing cost, while the quality of the images has to conform to a high standard.

Therefore modern camera modules should allow auto-focusing and minimal friction of the bearing for a movable lens barrel in order to achieve precise focusing of the camera.

It is desired that after a heavy mechanic shock a movable lens should be re-initialized without manual intervention to be able to continue to operate the camera module right away after the shock.

There are known patents dealing with the design of camera modules.

U.S. patent Publication (US 2008/0075446 to Utz) teaches a horological motor of the Lavet motor concept is used to form an actuator to control movement of a lens system to reduce power consumption in digital camera units used in various electronic equipment, e.g. PDA's, mobile phones, digital still cameras and camcorders, and as a result increase battery life. The coils of the horological motor are driven with CMOS I/O signals eliminating the need for high current motor drivers and allowing the integration of all picture capture functions, including the light sensitive pixel array, into a single chip to form a system on chip implementation. A plurality of actuators is used to control a lens system comprising auto focus, zoom and shutter and iris functions. A gear transmission system is used to allow the motor of the actuator to move in micro step, which allows calibration of the motor against mechanical barriers. When an environmental event resulting to a shock force to be imparted upon the gear system of the digital camera unit, the teeth of the gear system become disengaged allowing the gears of the digital camera unit to be freed of mechanical constraint and allow the gear system to be neutral to any mechanical force imposed between the optical elements and the horological motor. Under this condition the lens packets may move and loose their current position; therefore, a calibration cycle is used after such a shock condition. The calibration is performed by moving the lens packets to known end positions, designed as mechanical stops, and then the lens packets are moved in a controlled manner back to the position prior to the shock event or by the demand of the user.

U.S. patent (U.S. Pat. No. 7,408,586 to Ueda et al.) discloses a digital camera of the present invention including a microcomputer having a live view mode controlling so that image data generated by a CMOS sensor or image data obtained by subjecting the image data generated by the CMOS sensor to predetermined processing is displayed on a liquid crystal monitor as a moving image in real time, wherein the microcomputer controls so that, when the live view mode is set, the digital camera comes out of the live view mode, and setting information on the digital camera is displayed on the liquid crystal monitor, in accordance with the manipulation of the manipulation portion. Due to this configuration, in a digital camera that includes a movable mirror and is capable of displaying a subject image in a live view through an electronic viewfinder, the operability thereof can be enhanced. A gyrosensor measures an angular speed continuously. The CPU integrates the angular speed measured by the gyrosensor to obtain an angle. The CPU uses the obtained angle for controlling hand shaking correction in the hand shaking correction unit, and monitors a change amount per predetermined time of the obtained angle. Then, when the change amount reaches a predetermined value or larger, the CPU notifies the microcomputer that the change amount reaches a predetermined value or larger. Upon receiving this notification, the microcomputer determines that a shock has been applied to the camera.

U.S. patent (U.S. Pat. No. 7,333,723 to Sato) describes a camera comprising a sensor array wherein multiple pixels are arrayed in the base-length direction, a focusing unit for performing focusing of the camera based on the image output from the sensor array, a first detection unit for detecting the movement of the image signals in the base-length direction, a second detection unit for detecting the change in a predetermined pixel signal of the image signals over time, and a movement detection unit for performing movement detection based on the output from the first and second detection units. A CPU within the camera makes judgment with regard to the output from the acceleration sensor (accelerometer IC) in a judgment processing. Thus, even in the event that the camera receives shock due to the barrier being opened, or due to the camera being held by the user, a warning display regarding holding is prohibited for a predetermined time period in the processing of following steps.

SUMMARY OF THE INVENTION

A principal object of the present invention is to achieve methods and systems to re-initialize a camera module after a heavy mechanical shock:

A further object of the present invention is to use an extreme rapid displacement of the lens barrel of a camera module to detect a mechanic shock condition.

A further object of the present invention is to utilize an extreme rapid change of inductance of the linear electrical motor moving the lens barrel to detect a mechanic shock condition.

In accordance with the objects of this invention a method to detect a mechanic shock received by a camera module having a movable lens barrel has been achieved. The method invented comprises the steps of: (1) providing a camera module having a movable lens barrel, comprising a lens barrel control system comprising a motor to move the lens barrel, a lens barrel position sensing feature, and a control unit providing input to the motor to reach a desired position of the lens barrel, (2) detecting a mechanic shock via an unusual fast displacement of the lens barrel sensed by the position sensing feature, and (3) re-initializing the camera module after a mechanic shock has been detected.

In accordance with the objects of this invention camera module having a movable lens barrel, being capable to detect a mechanic shock has been disclosed. The camera module invented comprises, firstly, an image sensor, a shutter with an aperture function driven by a linear motor, said motor driving the shutter, wherein the motor has an integrated position sensing system, and a movable lens barrel. Furthermore the camera module comprises a motor to move the lens barrel into a desired position, a position sensing feature sensing an actual position of the lens barrel, and a control unit controlling the position of the lens barrel via said motor and detecting a mechanic shock upon an extreme change of input signals from said position sensing feature.

In accordance with the objects of this invention camera module having a movable lens barrel, being capable to detect a mechanic shock has been disclosed. The camera module comprises, firstly, a movable lens barrel, a motor to move the lens barrel into a desired position, and a position sensing feature sensing an actual position of the lens barrel. Finally the camera module comprises a control unit controlling the position of the lens barrel via said motor and detecting a mechanic shock upon an extreme change of input signals from said position sensing feature.

BRIEF DESCRIPTION OF THE DRAWINGS

FIG. 2 shows a block diagram of the basic components of the drop detection system of the present invention.

FIG. 3 illustrates a flowchart of a method invented to detect a mechanic shock received by a camera module having a movable lens barrel.

DESCRIPTION OF THE PREFERRED EMBODIMENTS

The preferred embodiments disclose methods and systems to detect a heavy shock condition for camera modules having a movable lens barrel, e.g. to support an auto-focus or zooming.

In a preferred embodiment of the invention a camera module having ball bearings to guide a movable lens barrel has been used. The drop detection method invented can also be applied to rod guided, or other guiding systems. In general the invention is applicable if the lens barrel is moved by a shock.

In a preferred embodiment of the invention a motor with integrated position detection is used to drive a movable lens barrel and to control an actual position of the lens barrel, e.g. as disclosed in the patent application DI08-006, titled "Camera Shutter and position control thereof", Ser. No. 12/658, 280, filing date Feb. 5, 2010. Other motors having a position control could be used as well.

In case of a heavy mechanical shock, as e.g. occurring if a mobile device, containing the camera module, drops to ground, the movable lens barrel of the auto-focus camera module will be displaced rapidly to an extreme position. This rapid displacement is used as indication of a mechanic shock condition by the position control system of the lens barrel.

Figure 1:
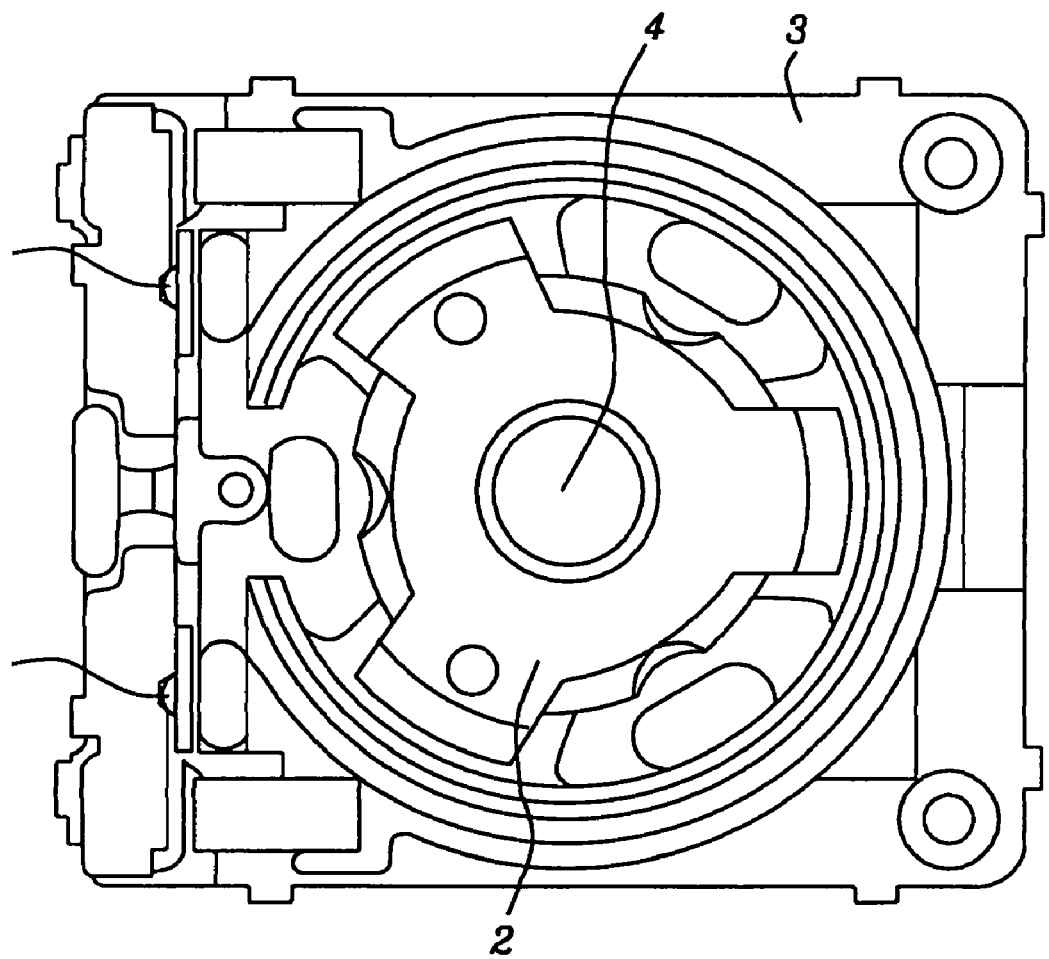
FIG. 1 shows a top view of a camera module using ball bearings according to the present invention.

In a preferred embodiment, the invention has been used with a camera module using ball bearings as shown in FIG. 1.

FIG. 1 shows a top view of an embodiment a camera module of the present invention. It shows a movable lens barrel 2 containing one or more lenses 4, ball bearings 1 to achieve minimal friction of the movement of the lens barrel and a carrier 3. The lens barrel 2 is moving up and down with respect to the carrier 3. The ball bearing system 1 is guiding the lens barrel 2 containing the lens 4.

Figure 8:
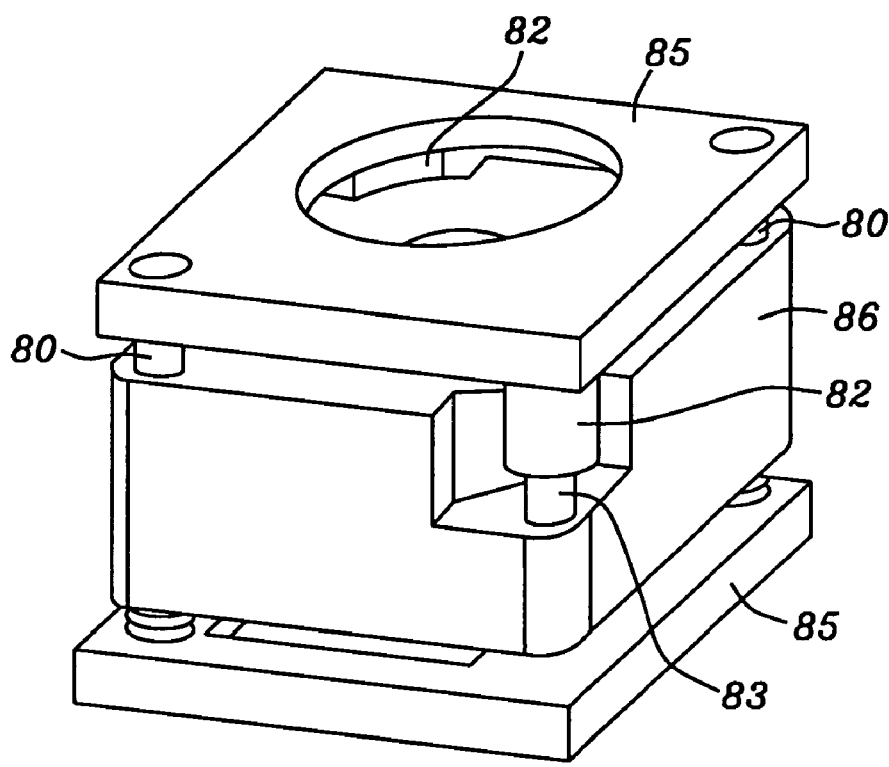
FIG. 8 shows an assembled camera module with a movable lens barrel, fixed parts, guiding rods, being diagonally deployed, and two bi-directional actuators comprising coils, which are firmly connected to fixed parts of the camera module, and magnets, which are firmly connected to the movable lens barrel.

FIG. 8 shows such an embodiment using guiding rods 80. second embodiment of the present invention. Guiding rods, diagonally located at two corners, guide the movable lens barrel. Two preferably identical actuators are located also diagonally at the other corners of the camera module. Adjusting springs can be applied to the guiding rods.

FIG. 8 shows an assembled camera module with a movable lens barrel 86, fixed parts 85, guiding rods 30, being diagonally deployed, and two bidirectional actuators comprising coils 82, which are firmly connected to fixed parts 85 of the camera module, and magnets 83, which are firmly connected to the movable lens barrel 86. The two actuators are also diagonally deployed. Depending upon the currents flowing through the coils 82, the magnets 83 are moved inside the coils 82. Each of the two guiding rods 80 and each of the two actuators are deployed in a separate corner of the camera module. It should be noted that a multitude of different arrangements comprising coils, magnets and iron can be used to implement linear motors, which can be used as actuators.

Bidirectional actuators, comprising coils wrapped around magnetic metal, preferably iron, and at least one permanent magnet are deployed to move the lens barrels of FIG. 1. In a preferred embodiment two of such actuators are used to move the lens barrel and the permanent magnet is mounted on the lens barrel and the iron carrying the coils is mounted on the carrier.

Figure 4:
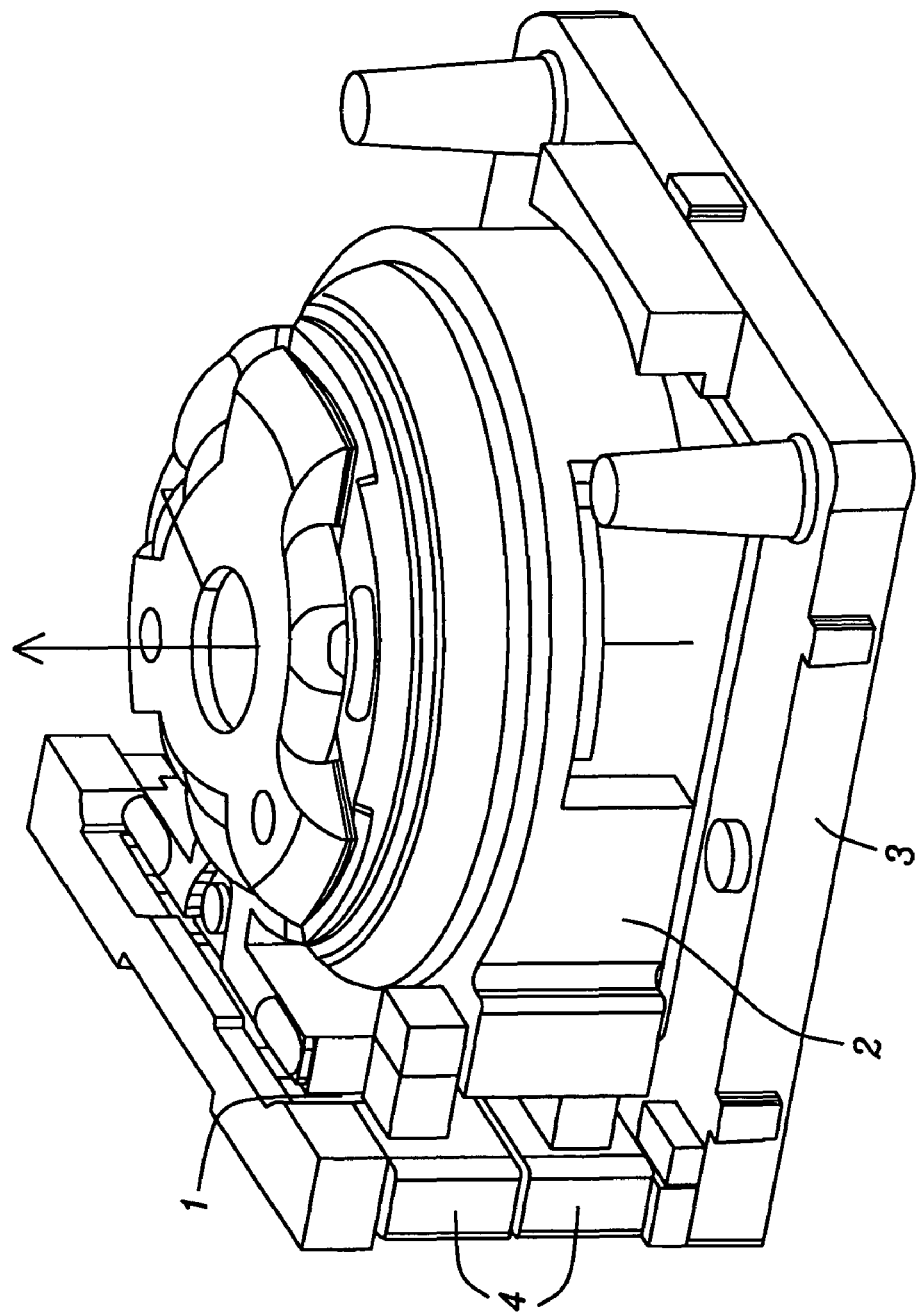
FIG. 4 shows a side view of the first embodiment of the present invention.

FIG. 4 shows a side view of the first embodiment of the present invention. It shows coils of one of the two actuators 4, having an integrated position sensor, the movable lens barrel 2, having a lens in the middle, one of two ball cages of the ball bearings 1, and a carrier 3 of the camera module. The movable lens barrel can move up and down in a direction as indicated by an arrow.

Bidirectional actuators, comprising coils wrapped around magnetic metal, preferably iron, and at least one permanent magnet are deployed to move the lens barrels shown in FIG. 1 and FIG. 4. In a preferred embodiment two of such actuators are used to move the lens barrel and the permanent magnet is mounted on the lens barrel and the iron carrying the coils is mounted on the carrier.

It should be noted that the present invention can be used with any kind of auto-focus camera modules having a position sensing of the lens barrel.

FIG. 2 shows a block diagram of the basic components of the drop detection system of the present invention. The invention can be used not only if the device containing the camera module falls to ground but also in case of any heavy mechanical shock. A mechanical shock is heavy if the force of the shock is strong enough to displace rapidly the movable lens barrel.

FIG. 2 illustrates a linear motor 21 having an integrated position sensing 22 driving the lens barrel 23 into a desired position. In a preferred embodiment a bidirectional motor 21, e.g. of a type as disclosed in the patent application DI08-006, titled "Camera Shutter and position control thereof", Ser. No. 12/658,280, filing date Feb. 5, 2010 has been deployed. The motor 21 comprises two coils wrapped around a piece of iron, which is fastened on a carrier of the camera module and a permanent magnet or any other magnetic material fastened firmly on the movable lens barrel 23. In case a current flows through one of the coils the lens barrel 23 moves and the inductance between the coils and the magnetic material on the lens barrel 23 changes dependent upon the distance between the lens barrel 23 and the coils. This inductance is used to sense the actual position of the lens barrel 23. Other types of motors in combination with a position sensing could be used as well.

Figure 6:
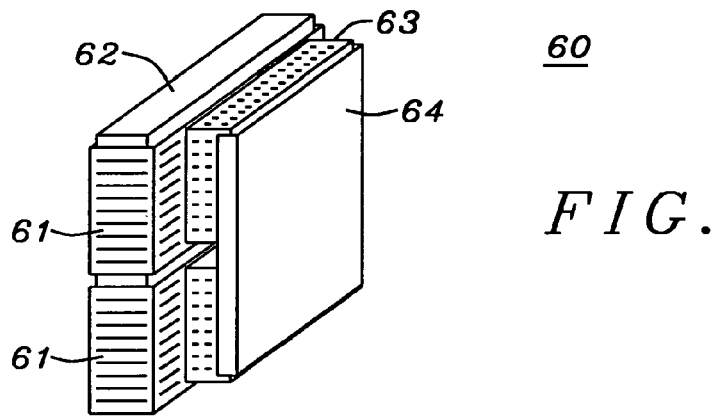
FIG. 6 shows an exploded view of the linear motor comprising a coil core, two coils, two permanent magnets, and a metallic case.

FIG. 6 shows an assembled view of simplified major components of a linear motor 60, which can be used to move and to control the position of the lens barrel. The linear motor comprises a coil core 62 around which two coils 61 are wrapped. The shape of the coil core can be adapted to specific requirements.

A method to sense the actual position of the lens barrel 23 using the inductance of the motor is described in the patent application DI08-006, titled "Camera Shutter and position control thereof", Ser. No. 12/658,280, filing date Feb. 5, 2010. Each motor consists of two coils. The inductance of each coil is measured and the difference of both inductances is a metric for the absolute position of the lens.

The invention does not necessarily require position detection by inductance changes. In general all absolute position detection systems may be used as e.g. a capacitive position sensor could also be used.

A control unit 25 receives as input a signal comprising a desired position of the lens barrel 23 and signals from the position-sensing component 22 describing the actual position of the lens barrel 23. During normal operation the control unit 25 compares the signals describing the actual position of the lens barrel 23 with the signal describing the desired position of the lens barrel 23 and, according to the differences between both positions, initiates in a control loop currents through the coils of the motor 21.

A key point of the present invention is that the control unit 25 detects rapid displacements of the lens barrel, caused by a mechanic shock via the position-sensing component 22. The control module 25 analyzes the incoming signals from the position-sensing feature 22. In case of an extreme change of the output signals from the position-sensing feature 22 the control unit 25 concludes that this extreme change has been caused by a mechanic shock. In this case it initiates a re-initialization of the camera module. This includes moving the lens barrel 23 to a home position. Furthermore, if required, it can send a signal 26 to the mobile device, containing the camera module that a mechanic shock has occurred. As a non-limiting example the mobile device can be a mobile phone.

Figure 7:
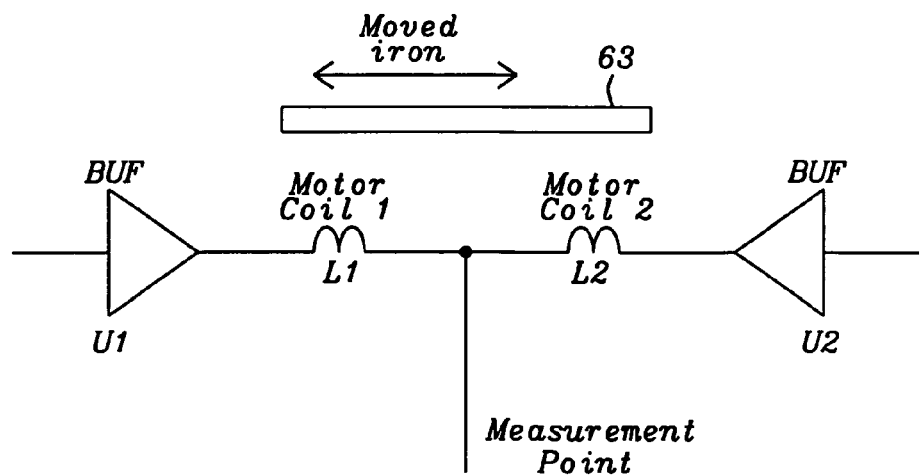
FIG. 7 shows the basic functions of the linear motor of the present invention and how the position sensing works using the linear motor.

FIG. 7 shows the basic functions of an embodiment of a linear motor of the present invention and how the position sensing works using the linear motor. It shows the two coils wrapped around a fixed iron 62 as shown in FIG. 6. The iron or one or more permanent magnets 63, fastened on the lens barrel moves as the barrel moves. The iron or permanent magnet 63 is driven by magnetic force depending upon the currents through the motor coils L1 and L2. The position sensing system has been disclosed in detail in the patent application U.S. application Ser. no. 12/658,280, which was incorporated by reference in its entirety, titled "Camera Shutter and position control thereof", filing date Feb. 5, 2010.

FIG. 3 illustrates a flowchart of a method invented to detect a mechanic shock received by a camera module having a movable lens barrel. A first step 30 describes the provision of a camera module having a movable lens barrel, comprising a lens barrel control system comprising a motor to move the lens barrel, a lens barrel position sensing feature, and a control unit providing input to the motor to reach a desired position of the lens barrel. In a preferred embodiment of the invention a position-sensing feature integrated in the motor has been used. This position-sensing feature senses the change of inductance of the motor occurring with the movements of the lens barrel. The next step 31 illustrates detecting a mechanic shock via an unusual fast displacement of the lens barrel sensed by the position-sensing feature. The last step 32 describes re-initialization of camera module after a mechanic shock has been detected.

The control unit of the present invention also controls one or more motors with integrated position control to move shutter blades of the camera module as disclosed in the patent application DI08-006, titled "Camera Shutter and position control thereof", Ser. No. 12/658,280, filing date Feb. 5, 2010. This control unit is integrated in an integrated circuit. The shutter of the present invention can also be used as an aperture.

Figure 5:
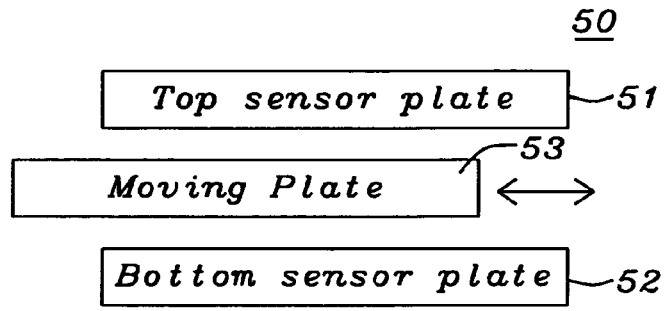
FIG. 5 illustrates a basic arrangement of a capacitive sensor sensing the position.

FIG. 5 illustrates a basic arrangement of a capacitive sensor 50. The sensor comprises a top sensor plate 51 and a bottom sensor plate 52. The capacitance of this arrangement depends upon the actual position of a moving plate 53, which is firmly connected to the lens barrel, and hence the actual position of lens barrel can be measured by measuring the capacitance between both sensor plates 51 and 52.

While the invention has been particularly shown and described with reference to the preferred embodiments thereof, it will be understood by those skilled in the art that various changes in form and details may be made without departing from the spirit and scope of the invention.

Figure 9:
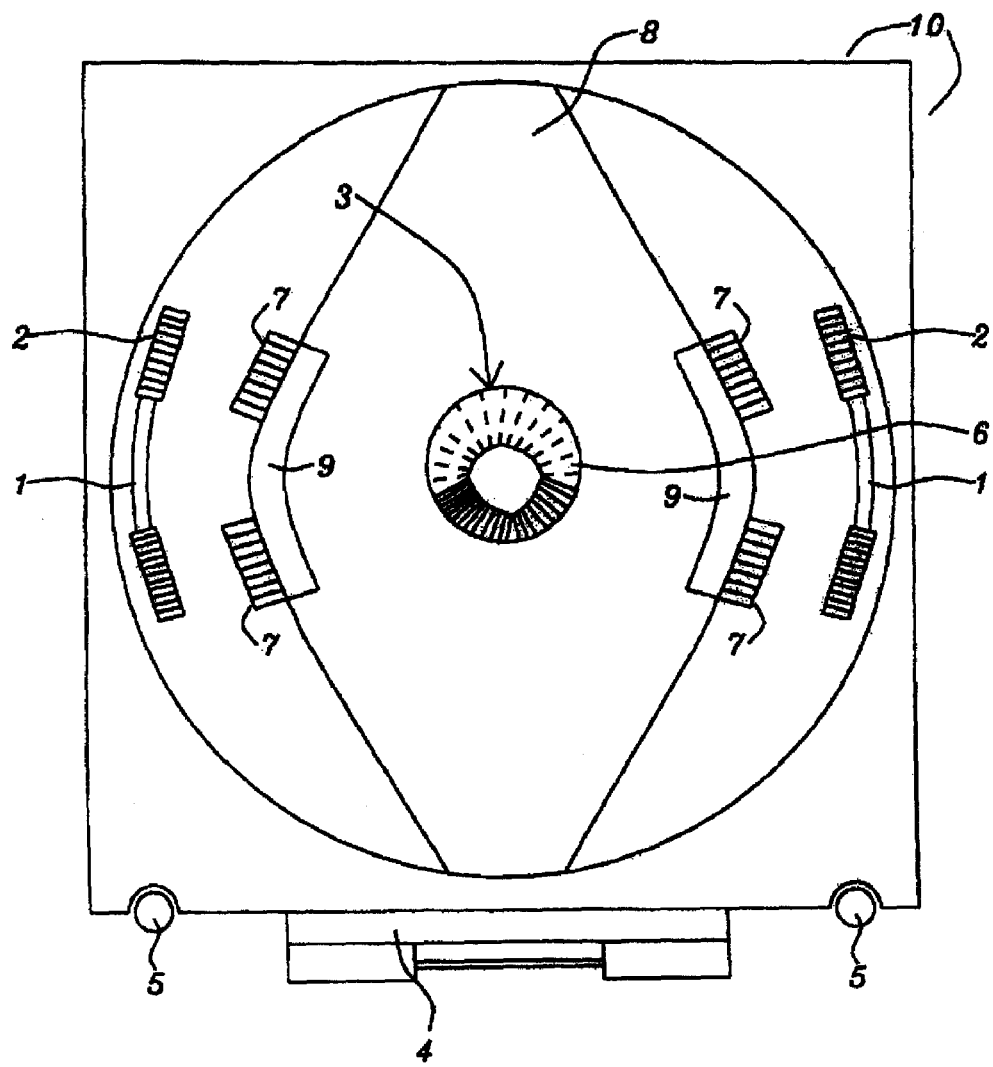
FIG. 9 shows a preferred embodiment of the shutter system invented. The shutter system is mounted on top of the lens barrel (not visible) or on top of the moving part of the lens system.

FIG. 9 shows a preferred embodiment of the shutter invented. The shutter is mounted on top of a lens barrel (not visible) or on top of the moving part of the lens system.

The coils 92 of two bi-directional linear motors driving shutter blades 96 are wrapped around iron coil cores 91. The coils 92 and iron coil cores 91 are mounted on the case of the shutter and inside of a lens barrel of a zoom lens system. Furthermore each linear motor driving shutter blades comprises two magnets 7 fastened on a movable yoke 98, which is mechanically connected to the shutter blades 96. The magnets are moved by magnetic force depending upon the currents through the coils 92 and the linear motors are moving the shutter blades 96 via the yoke 98. The opening 93 of the yoke 98 defines a maximal aperture opening.

The shutter case can move, together with the blades 98, coils 92 and coil cores 91, up and down along the optical axis of the camera depending upon the movements of the zoom lens barrel. The coils 92 are located on a fixed part of the shutter system. The energy to move the shutter blades comes from the coils. No flexible wires are required to drive the motors.

What is claimed is:

1. A method to detect a mechanic shock received by a camera module having a movable lens barrel, comprising the following steps:
   (1) providing a camera module having a movable lens barrel, comprising a lens barrel control system, comprising a motor to move the lens barrel, wherein the motor comprises two coils and a moving iron which is firmly connected to the lens barrel, a lens barrel position sensing feature, and a control unit providing input to the motor to reach a desired position of the lens barrel;
   (2) detecting a mechanic shock via an unusual fast displacement of the lens barrel sensed by the position sensing feature wherein the position sensing feature is measuring a delta of inductance of the two motor coils used to define a position of the lens barrel; and
   (3) re-initializing the camera module after a mechanic shock has been detected.

2. The method of claim 1 wherein the lens barrel is guided by ball bearings.

3. The method of claim 1 wherein said the position sensing feature is integrated in the motor.

4. The method of claim 1 wherein said re-initialization comprises moving the lens barrel to a home position.

5. The method of claim 1 wherein the lens barrel is guided by rods.

* * * * *